UNITED STATES PATENT OFFICE.

SAMUEL S. SADTLER, OF SPRINGFIELD TOWNSHIP, MONTGOMERY COUNTY, PENNSYLVANIA.

PROCESS OF RECOVERING VOLATILE SOLVENTS.

1,365,791.  Specification of Letters Patent.  Patented Jan. 18, 1921.

No Drawing.  Application filed May 18, 1920. Serial No. 382,360.

*To all whom it may concern:*

Be it known that I, SAMUEL S. SADTLER, a citizen of the United States, residing at Springfield township, in the county of Montgomery and State of Pennsylvania, have invented certain new and useful Improvements in Processes of Recovering Volatile Solvents, of which the following is a specification.

This invention relates to processes of recovering volatile solvents, such as ether, acetone, and the like, and has for its principal object to provide an improved process by means of which volatile solvents can be readily and substantially completely absorbed and thereby separated from air or other gases containing the same, and later readily and substantially completely separated from the absorbing agent.

Another object of the invention is to provide a process wherein the absorbing agent may be repeatedly used without material deterioration.

A further object of the invention is to improve processes of recovering volatile solvents, wherein non-drying marine oils, such for example, as sperm oil, in which such solvents are readily soluble, are employed as absorbing agents, by the employment therewith of oils, such as lard oils, which are in themselves, not as good solvents for the material to be absorbed as the marine oil.

A further object of the invention is to improve volatile solvent recovery processes wherein such non-drying oils are employed, by adding to such oils a solvent of the material to be absorbed which is also a solvent of the non-drying oil employed.

A further object of the invention is to improve processes of recovering volatile solvents wherein non-drying oils are employed by increasing the "life" or permanency of the oils for repeated use in such processes and to effect the prevention of foaming of such oils in the practice of such processes.

In the recovery of volatile solvents, the vapor of the solvent to be recovered is brought into intimate contact with a solvent of the liquid to be recovered, whereby it is dissolved therein. The contact of the volatile solvent and liquid in which it is absorbed is usually effected by passing an aeroform fluid containing the vapor of the volatile solvent through the liquid in which it is to be dissolved, or by passing such fluid through a tower wherein it is sprayed with the absorbing agent, as is well known by those skilled in the chemical arts. The solvent is later separated from the absorbing agent, usually by distillation.

The use of non-drying marine oils as absorbing agents in volatile solvent recovery processes has been proposed but, in use, they are not wholly unaffected and their "life" or permanency is thereby diminished. Furthermore, they are not sufficiently fluid to act with the maximum efficiency and in use, have a tendency to foam.

Now, I have discovered that the solvent action of non-drying marine oils and particularly sperm oil, for volatile solvents can be satisfactorily utilized by adding thereto an oil, such as lard oil, in which the solvent to be recovered is less soluble than in the non-drying marine oil, a petroleum oil, preferably a light lubricating oil and a relatively small quantity of an alcohol, preferably ordinary or denatured ethyl alcohol.

I have found in practice that a considerable measure of success can be obtained in the practice of my process even though the alcohol and petroleum oil are not employed but it is advantageous to employ the petroleum oil and preferably also, the alcohol.

In using only the non-drying marine oil and an oil in which the solvent to be recovered is less soluble, I prefer to employ the following materials in approximately the proportions indicated:

Sperm oil_____ 50 parts by volume
Lard oil_____ 25   "    "    "
Light lubricating oil__ 25   "    "    "

In making use of a foaming preventing agent, I add to either of the compositions set forth from 1 to 10 per cent. by volume, and preferably about 2 per cent. by volume, of ordinary or denatured ethyl alcohol.

The vapors of the volatile solvent to be recovered are brought into intimate contact with the absorbing agent in any of the usual ways in which solvent recovery is practised, as by passing an aeroform fluid containing the solvent through the absorbing agent or by spraying it therewith in absorption towers. The solvent is readily separated from the absorbing agent by simple distillation and such agent may be reused repeatedly without material deterioration.

While I prefer to employ a light lubricating oil, any petroleum fraction may be used. If a light lubricating oil is employed, it may be of a light straw color. If a lighter fuel oil, such as kerosene, is used, it should preferably be a highly refined water white oil. It is highly desirable that the petroleum oil be a free flowing oil and substantially free of the highly volatile constituents of petroleum, such as benzin, naphtha and the like.

The use of my process is particularly valuable in the recovery of ether but may be advantageously employed in the recovery of other volatile solvents.

While I have obtained the most satisfactory results in preventing foaming of non-drying oils used in my process, by employing a relatively small amount of ethyl alcohol, other free flowing alcohols, notably methyl, propyl and butyl alcohol may be used with some measure of success.

While I have described the practice of my process in detail, it is to be understood that such description is illustrative rather than restrictive, that the details of procedure and proportions of materials may be widely varied and that known chemical equivalents of such materials may be employed, all without departure from the spirit of my invention or the scope of the appended claims.

Having thus described my invention, I claim:

1. The process of recovering volatile solvents, comprising causing vapors of the solvent to be recovered to be absorbed by a non-drying marine oil in admixture with an oil of greater fluidity, and separating the solvent from the absorbing agent.

2. The process of recovering volatile solvents, comprising causing vapors of the solvent to be recovered to be absorbed by a non-drying marine oil in admixture with an oil in which the solvent is soluble to some extent but less soluble than in the marine oil, and separating the solvent from the absorbing agent.

3. The process of recovering volatile solvents, comprising causing vapors of the solvent to be recovered to be absorbed by a non-drying marine oil in admixture with lard oil, and separating the solvent from the absorbing agent.

4. The process of recovering volatile solvents, comprising causing vapors of the solvent to be recovered to be absorbed by a mixture of sperm and lard oils, and separating the solvent from the absorbing agent.

5. The process of recovering volatile solvents, comprising causing vapors of the solvent to be recovered to be absorbed by a mixture of a non-drying oil, an oil in which the solvent is soluble to some extent but less soluble than in the non-drying oil, and petroleum oil, and separating the solvent from the absorbing agent.

6. The process of recovering volatile solvents, comprising causing vapors of the solvent to be recovered to be absorbed by a mixture of sperm oil, lard oil and petroleum oil, and separating the solvent from the absorbing agent.

7. The process of recovering volatile solvents, comprising causing vapors of the solvent to be recovered to be absorbed by an absorbing agent having a tendency to foam, to which has been added a relatively small amount of an alcohol, and separating the solvent from the absorbing agent.

8. The process of recovering volatile solvents, comprising causing vapors of the solvent to be recovered to be absorbed by an absorbing agent having a tendency to foam, to which has been added a relatively small amount of ethyl alcohol, and separating the solvent from the absorbing agent.

9. The process of recovering volatile solvents, comprising causing vapors of the solvent to be recovered to be absorbed by a mixture of a non-drying oil, an oil in which the solvent is soluble to some extent but less soluble than in the non-drying oil, petroleum oil and alcohol, and separating the solvent from the absorbing agent.

10. The process of recovering volatile solvents, comprising causing vapors of the solvent to be recovered to be absorbed by a mixture of sperm oil, lard oil, petroleum oil and alcohol, and separating the solvent from the absorbing agent.

11. The process of recovering volatile solvents, comprising causing vapors of the solvent to be recovered to be absorbed by a mixture comprising sperm oil and lard oil of which the sperm oil forms approximately 50 per cent. by volume, and separating the solvent from the absorbing agent.

12. The process of recovering volatile solvents, comprising causing vapors of the solvent to be recovered to be absorbed by a mixture comprising sperm oil, lard oil and petroleum oil, of which the sperm oil forms approximately 50 per cent. by volume, and separating the solvent from the absorbing agent.

13. The process of recovering volatile solvents, comprising causing vapors of the solvent to be recovered to be absorbed by a mixture comprising sperm oil, lard oil, petroleum oil and alcohol in which the sperm oil comprises approximately 50 per cent. by volume, and separating the solvent from the absorbing agent.

14. The process of recovering volatile solvents, comprising causing vapors of the solvent to be recovered to be absorbed by a mixture consisting of sperm oil, lard oil, petroleum oil and alcohol of which the sperm oil forms approximately 50 per cent. by volume, the lard oil and petroleum oil being present in approximately equal parts by volume and the alcohol being present in a minor proportion, and separating the solvent from the absorbing agent.

In testimony whereof I affix my signature in presence of two witnesses.

SAMUEL S. SADTLER.

Witnesses:
 A. M. STOKES,
 ETHEL MEWAUGER.